US006944412B2

(12) United States Patent
Mishima et al.

(10) Patent No.: US 6,944,412 B2
(45) Date of Patent: Sep. 13, 2005

(54) JOB INFORMATION DISPLAY APPARATUS, JOB EXECUTION APPARATUS, JOB INSTRUCTION APPARATUS AND JOB PROCESSING SYSTEM

(75) Inventors: Kimie Mishima, Itami (JP); Eiichi Yoshida, Toyokawa (JP); Koji Naito, Toyohashi (JP); Munetaka Fujita, Gamagoori (JP); Hiroshi Sumiyama, Hoi-gun (JP)

(73) Assignee: Minolta Company, Ltd., Osaka (JP)

( * ) Notice: Subject to any disclaimer, the term of this patent is extended or adjusted under 35 U.S.C. 154(b) by 317 days.

(21) Appl. No.: 10/359,302

(22) Filed: Feb. 6, 2003

(65) Prior Publication Data

US 2003/0219272 A1 Nov. 27, 2003

(30) Foreign Application Priority Data

Feb. 7, 2002 (JP) ....................................... 2002-030466

(51) Int. Cl.[7] ........................... G03G 15/00; H04N 1/00

(52) U.S. Cl. .......................... 399/81; 345/581; 358/1.9; 399/8; 715/526

(58) Field of Search .............................. 399/8, 9, 1, 81, 399/82, 85, 86; 345/581, 589; 361/681; 715/526, 528, 529; 358/1.9, 1.11

(56) References Cited

U.S. PATENT DOCUMENTS 5,969,826 A * 10/1999 Dash et al. ................... 399/81
5,983,051 A 11/1999 Mishima et al.
6,421,509 B1 * 7/2002 Nomura et al. ............... 399/81
6,501,485 B1 * 12/2002 Dash et al. .................... 399/81
6,778,288 B1 * 8/2004 Ogaki et al. ............... 358/1.15

FOREIGN PATENT DOCUMENTS

JP 2000-330534 11/2000

* cited by examiner

*Primary Examiner*—Sophia S. Chen
(74) *Attorney, Agent, or Firm*—Morrison & Foerster LLP

(57) ABSTRACT

Job data is created by a personal computer 4. A display attribute and a program corresponding to the display attribute are attached to this job data. On the other hand, a received job is displayed on a screen of an operation panel of a digital copier 1. Whether or not the display attribute is attached to job data is determined in display processing of this operation panel. Then, if the display attribute is attached, the display screen is changed corresponding to the display attribute. This display attribute contains enlargement of a display content, change of display color and the like. If a function corresponding to the display attribute is not supported, a program attached to job data is executed. Consequently, there is provided a job information display apparatus, a job execution apparatus, a job instruction apparatus and a job processing system capable of changing the display screen depending on the display attribute of the job.

19 Claims, 12 Drawing Sheets

| | | | | |
|---|---|---|---|---|
| JOBID | IMAGE DATA | MODE | DISPLAY ATTRIBUTE 1 | OPERATION PROCESSING PROGRAM OF DISPLAY ATTRIBUTE 1 |
| | | | DISPLAY ATTRIBUTE 2 | OPERATION PROCESSING PROGRAM OF DISPLAY ATTRIBUTE 2 |
| | | | DISPLAY ATTRIBUTE 3 | OPERATION PROCESSING PROGRAM OF DISPLAY ATTRIBUTE 3 |

FIG.5

| JOBID | IMAGE DATA | MODE | DISPLAY ATTRIBUTE 1 | OPERATION PROCESSING PROGRAM OF DISPLAY ATTRIBUTE 1 |
| --- | --- | --- | --- | --- |
| | | | DISPLAY ATTRIBUTE 2 | OPERATION PROCESSING PROGRAM OF DISPLAY ATTRIBUTE 2 |
| | | | DISPLAY ATTRIBUTE 3 | OPERATION PROCESSING PROGRAM OF DISPLAY ATTRIBUTE 3 |

JOB INFORMATION DISPLAY APPARATUS, JOB EXECUTION APPARATUS, JOB INSTRUCTION APPARATUS AND JOB PROCESSING SYSTEM

This application is based on application No. 2002-30466 filed in Japan, the contents of which is hereby incorporated by reference.

BACKGROUND OF THE INVENTION

1. Field of the Invention

The present invention relates to a job processing system having a job instruction apparatus and a job execution apparatus and more particularly to a job execution apparatus having a display screen, a job information display apparatus thereof, a job instruction apparatus for instructing a job to the job execution apparatus and a job processing system comprised of those apparatuses.

2. Description of Related Art

Conventionally, the display screen of a digital copier or the like displays job information received from such an information apparatus terminal as a personal computer. With this display screen, user can recognize whether or not his/her own job is registered or an execution condition of it. Further, he/she can recognize accumulation condition of other job.

However, the above-described conventional technology has following problems. That is, as for the display of the job, every job is displayed in a uniform style and its display magnification or display style is not changed depending on each job. For the reason, a displayed content may be difficult to see for an aged people or a handicapped person (hereinafter referred to as handicapped person) depending on their handicap level.

As a technology for solving this problem, there is an example in which a terminal whose display needs to be changed and its display attribute are registered in a job information display apparatus preliminarily. Then, if a job transmitted from that terminal is displayed, a representation corresponding to the registered display attribute is carried out. This function is valid if that terminal is registered in the job information display apparatus. However, this function is not valid unless that terminal is registered in the job information display apparatus. That is, if a uniform representation is carried out in an entire system comprised of plural job information display apparatuses, the same registration needs to be done in every job information display apparatuses. Further, as the number of the registered terminals increases, increased load is applied to a memory and control of the job information display apparatus. Thus, an expected effect is more difficult to obtain as the system is expanded.

SUMMARY OF THE INVENTION

The present invention has been made in view of the above circumstances and has an object to overcome the above problems and to provide a job information display apparatus, a job execution apparatus, a job instruction apparatus and a job processing system capable of changing its display style depending on a job representation attribute.

To achieve the above-described object, according to an aspect of the present invention, there is provided a job information display apparatus for displaying information of a job on a screen, comprising: a display attribute recognition section for recognizing the display attribute of each job; and a display controller for changing the display style for job information based on the display attribute recognized by the display attribute recognition section.

Further, according to another aspect of the present invention, there is provided a job execution apparatus for executing a job comprising: a display for displaying information of a job; a display attribute recognition section for recognizing the display attribute of each job; and a display controller for changing the display style of information of each job displayed on the display based on the display attribute recognized by the display attribute recognition section.

According to still another aspect of the present invention, there is provided a job instruction apparatus for transmitting job data to the job execution apparatus comprising: a job data creating section for creating job data: and a transmitting section for transmitting the job data created by the job data creating section to the job execution apparatus, wherein the job data creating section attaches a signal relating to the display attribute to a created job data.

Then, the job transmitter/receiver system of the present invention is constituted of the job instruction apparatus and the job execution apparatus of the present invention.

The job instruction apparatus of the present invention creates job data by means of the job data creating section. A signal relating to the display attribute is attached to this job data. This display attribute includes for example, display magnification change, display color change and the like. Then, the transmitting section transmits job data to the job execution apparatus. The job execution apparatus recognizes the display attribute of each job by means of the display attribute recognition section. The display controller changes the display style of information of each job to be represented on the display corresponding to a recognized display attribute. Namely, the display style of each job is changed.

Preferably, in the job instruction apparatus of the present invention, a signal relating to the display attribute attached to the job data by the job data creating section includes a display program corresponding to the display attribute. If a function corresponding to an acquired display attribute is not supported, the job execution apparatus of the present invention executes that display program. Consequently, even if the function corresponding to the display attribute is not supported, the display style can be changed to a display style fitting to the display attribute.

As described above, according to the present invention, there is provided a job information display apparatus, a job execution apparatus, a job instruction apparatus and a job transmitter/receiver system capable of changing the display style depending on the display attribute of job.

BRIEF DESCRIPTION OF THE DRAWING

For a better understanding of the present invention, reference is made to the following detailed description of the invention, just in conjunction with the accompanying drawings in which:

FIG. 5 is a diagram showing data structure of job data;

DETAILED DESCRIPTION OF THE PREFERRED EMBODIMENTS

Hereinafter, the embodiment of the present invention will be described in detail with reference to the accompanying drawings. According to this embodiment, the present invention is applied to a digital copier having display function and a system in which that copier is connected to a network together with a personal computer.

Figure 1:
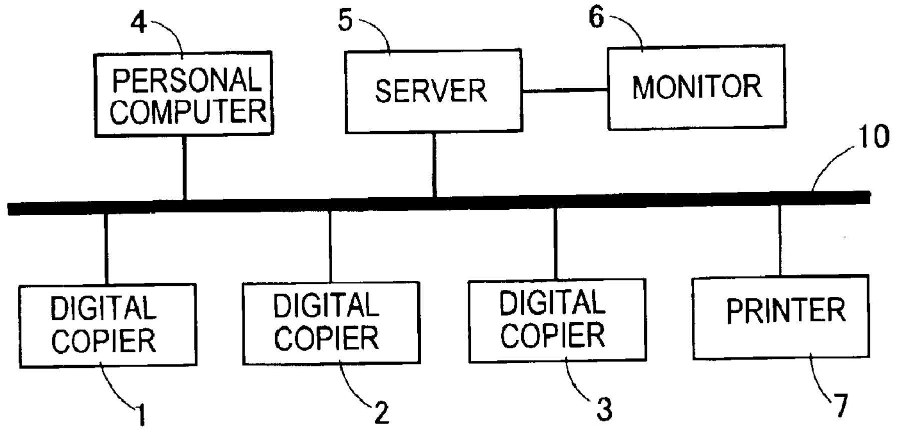
FIG. 1 is a block diagram of a job transmitter/receiver system according to an embodiment.

The job transmitter/receiver system of this embodiment is so constructed as shown in FIG. 1. Namely, this system comprises a digital copier 1, a digital copier 2, a digital copier 3, a personal computer 4 and a server 5. The respective digital copiers, the personal computer 4 and the server 5 are connected through a network 10. Each digital copier has an operation panel, which is capable of displaying a job operation condition. The number of the digital copiers may be of any number if it is one or more. Additionally, a printer 7, a scanner and the like are connected to this system through the network 10.

Figure 2:
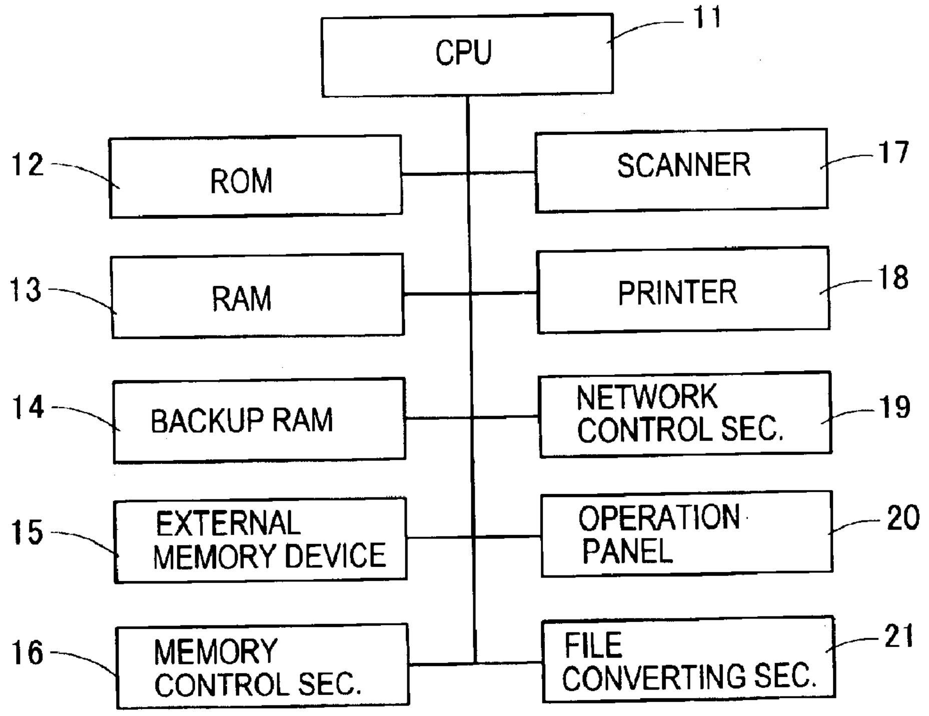
FIG. 2 is a block diagram of a digital copier according to an embodiment.

Next, the digital copier 1 will be described. The digital copier 1 comprises, as shown in FIG. 2, a CPU 11 for executing an entire control, a ROM 12 for storing system program and the like for the digital copier 1, a RAM 13 for storing control data temporarily, a backup RAM 14 for storing data necessary for various kinds of backups for machine setting-up and the like, an external memory device 15 for storing image data files, a memory control section 16 for controlling compression and extension of read image data, a scanner 17 for executing image data reading, a printer 18 for printing images, a network control section 19 for transmitting/receiving data to/from network, an operation panel 20, which is a display screen, and a file converting section 21 for converting image data into a file format which the personal computer can read. This digital copier 1 includes a function for printing out an image read by the scanner 17 and a function for printing an image transmitted from a personal computer or the like through network. Further, the digital copiers 2, 3 include the same functions. The printer 7 has the functions of the digital copier 1 except that of the scanner 17.

Figure 3:
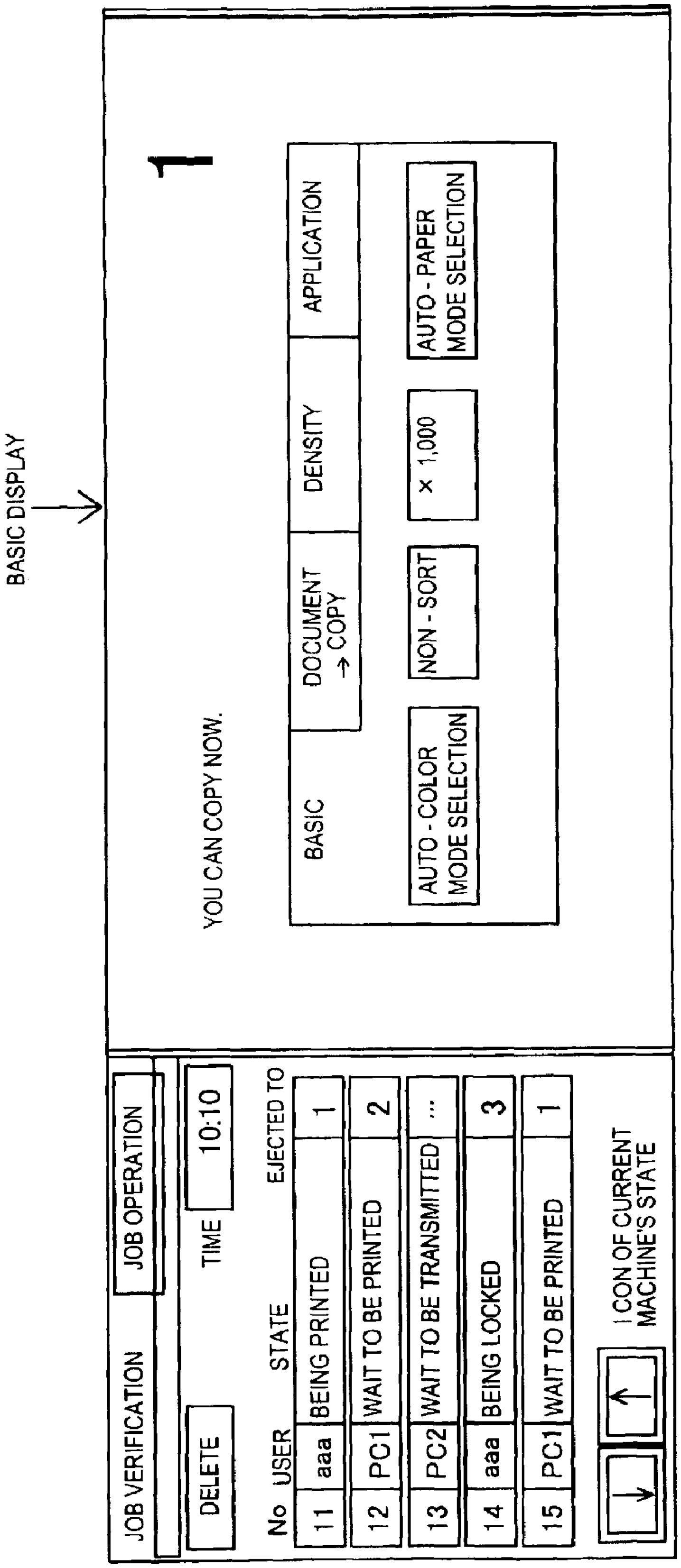
FIG. 3 is a diagram showing an example (basic screen) of the display screen of an operation panel.
Figure 4:
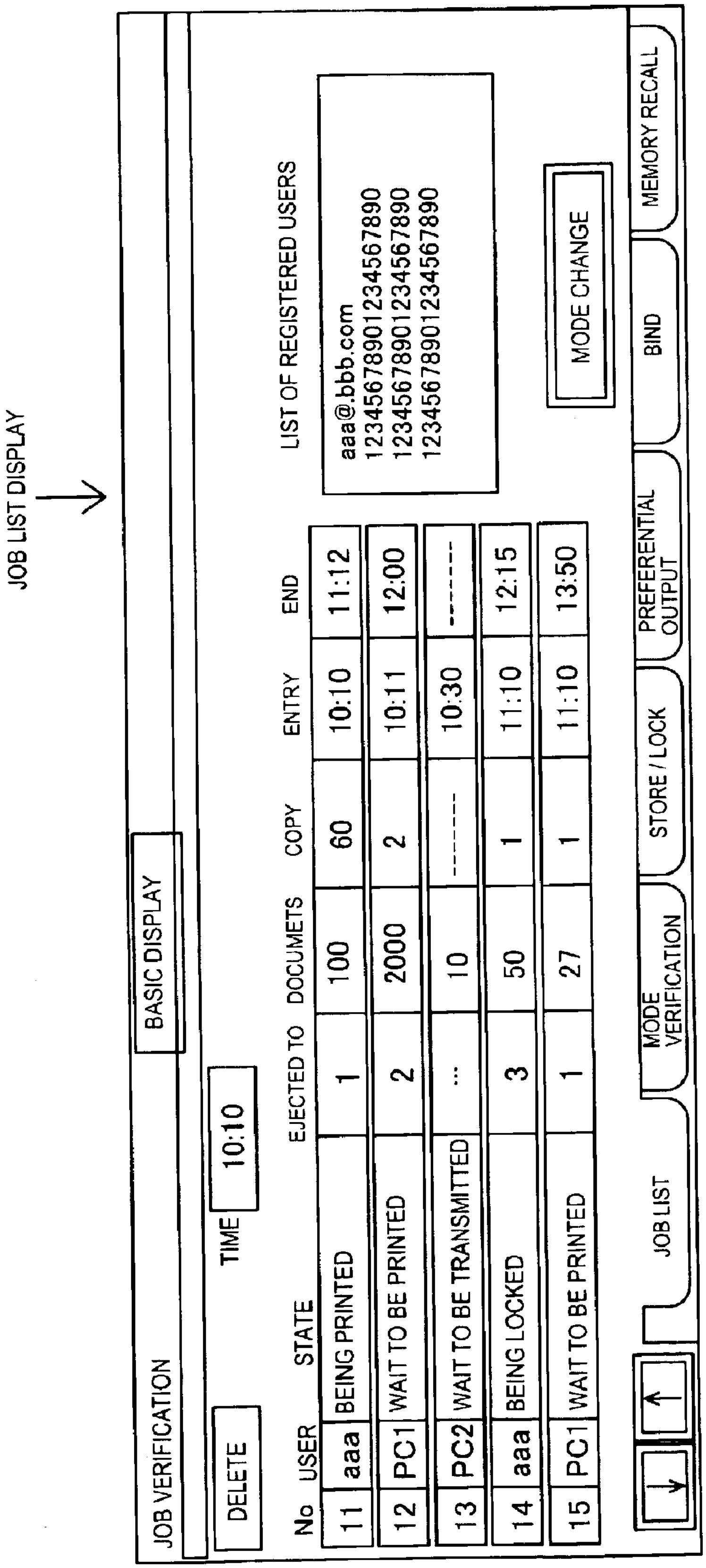
FIG. 4 is a diagram showing an example (list display screen) of the display screen of the operation panel.

The operation panel 20 of the digital copier 1 can display a basic screen shown in FIG. 3 as a screen relating to job information. This screen lists states of print job (hereinafter referred to as job) on its left side. Keys for setting various kinds of copying conditions (copy mode) and currently set copying condition are displayed on its right side. Further, this screen enables to delete a selected job. The operation panel 20 can change the current screen to a screen for indicating detailed information of the job as shown in FIG. 4 when a "job operation" button in FIG. 3 is pressed. This screen indicates detailed information such as copy quantity, registration time and the like of each job. Further, a mode necessary for executing the job can be changed.

Next, the control on the operation screen of the digital copier 1 will be described. Hereinafter, a control for a case where job data is received from the personal computer 4 and that job is displayed on the operation panel 20 will be described.

First, job data to be transmitted from the personal computer 4 will be described. This job data is constituted of data shown in FIG. 5. Namely, the job data is comprised of JOB ID, image data, mode information, display attributes and attached programs. Of this job data, the JOB ID, image data and mode information are data necessary for printing and the display attributes and programs are data necessary for screen display. The JOB ID mentioned here is a number given to each job in order to identify the job when data is transmitted. The mode information is attribute information relating to printing such as paper feed port, resolution. These data necessary for printing are always included in the job data. On the other hand, the display attribute refers to an attribute relating to the screen display such as magnification, display color changing. This display attribute is attached to the job data as required. Further, the attached display attribute is not restricted to one. That is, the job data may contain plural display attributes. If an apparatus for screen display (digital copier in this embodiment) does not support a function for carrying out an operation along a display attribute, the program enables that apparatus to execute the same operation. Under this embodiment, display attribute 1 is intended for display magnification change, display attribute 2 is intended for changing display color and display attribute 3 is intended for changing character size and font. Further, the respective display attributes include a program for executing its operation.

Figure 6:
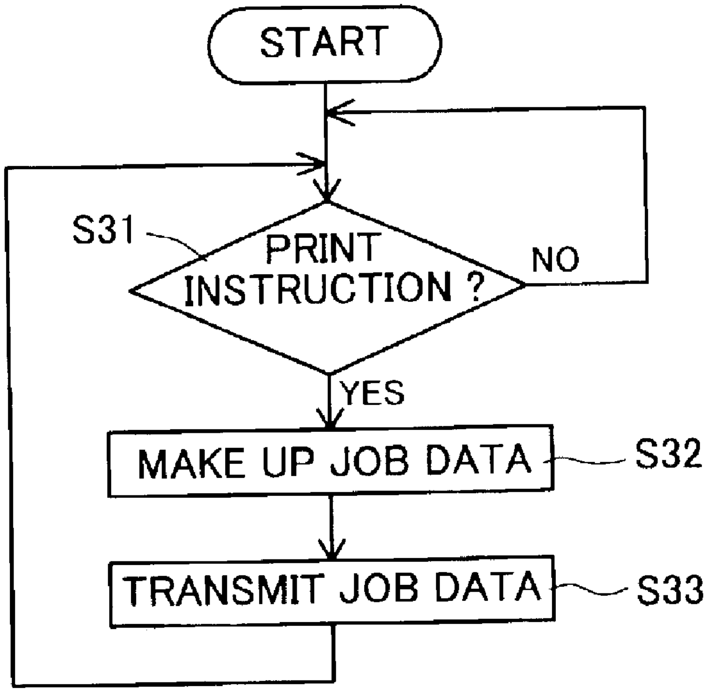
FIG. 6 is a flow chart showing job data transmission processing.

Next, a processing of printer driver within the personal computer 4 in order to transmit a print-related job from the personal computer 4 will be described with reference to the flow chart of FIG. 6. An operating person selects an image to be printed out and sets up a display attribute to be transmitted to the operation panel 20 and then, operate the personal computer 4 to send a print instruction to the digital copier 1. Then, the printer driver creates job data based on that print instruction and transmits that job data to the digital copier 1. For the purpose, as a processing of the print driver, whether or not any print instruction exists is determined (S31). Unless a print instruction exists (S31: NO), the system stands by until any print instruction is dispatched. If a print instruction is dispatched (S31: YES), a job data is created (S32). As for the creation procedure of the job data, first, an image and a mode selected by the operating person are adopted as the image data and mode of the job data. Next, a display attribute set up by the operating person is adopted as the display attribute of the job data. Here, a program corresponding to the display attribute is attached also. Next, the job data is transmitted to the digital copier 1 (S33). After the processing of S33 is ended, the processing returns to S31, so that the system stands by for a next print instruction.

Figure 7:
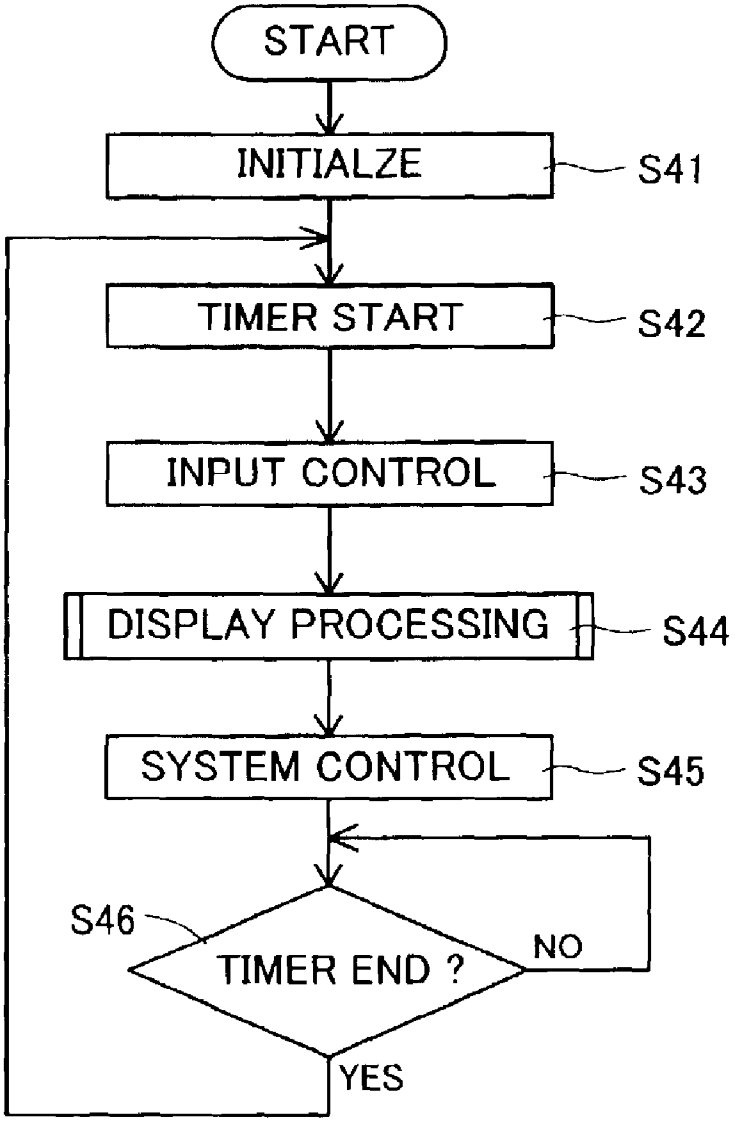
FIG. 7 is a flow chart showing a processing relating to the operation panel.

Next, an operation of the CPU 11 for controlling the operation panel 20 will be described with reference to the flow chart of FIG. 7. First, by starting the digital copier 1, system program stored in the ROM 12 is executed so as to initialize the RAM 13 thereby various register settings being initialized. Further, the display attribute of the operation panel 20 is initialized (S41). Next, an internal timer for carrying out timing control is started (S42). Next, input controls of hard keys and touch panel are carried out (S43). Next, display processing of a display screen on the operation panel 20 is carried out (S44). Next, controls necessary for the digital copier 1 are executed (S45). Next, whether or not the internal timer is ended is determined (S46). Then, unless the internal timer is ended (S46: NO), the system waits for the internal timer to be ended. On the other hand, if the internal timer is ended (S46: YES), the processing returns to S42, in which the internal timer is restarted.

Figure 8:
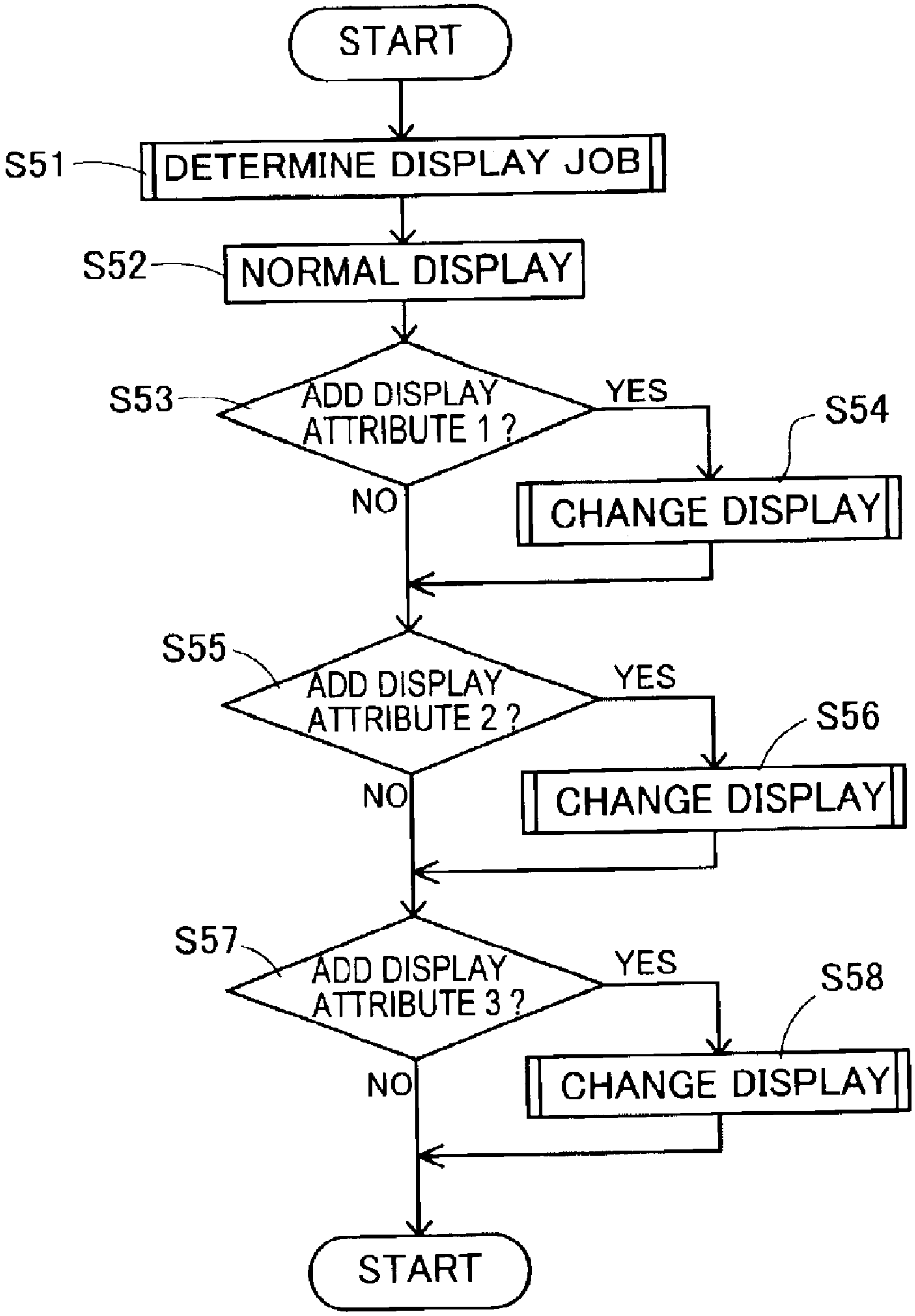
FIG. 8 is a flow chart showing display processing relating to the operation panel.

Next, a display processing of S44 will be described in detail with reference to the flow chart of FIG. 8. First, a job to be displayed on the operation panel 20 is determined (S51). Next, this job is displayed in normal display state on the operation panel 20 (S52). That is, a display based on default display attribute, set in the operation panel 20 originally is carried out. Next, a display is changed based on the display attribute of each job. According to this embodiment, whether or not the display attribute 1 is attached to job data of a determined job is determined (S53). If the display attribute is attached (S53: YES), a display change processing (display magnification change processing in this embodiment) for changing the screen of the operation panel 20 corresponding to the display attribute 1 is carried out (S54). In this display change processing if the job information is listed, only indication of a portion relating to that job information is changed. If only the job information is displayed, the indication of the entire screen is changed. This is the same for the display change processings of S56, S58 described later. If the display attribute 1 is not attached (S53: NO) or the processing of S54 is ended, whether or not the display attribute 2 is attached is determined (S55). If the display attribute 2 is attached (S55: YES), the display change processing (display color change processing in this embodiment) of changing the screen on the operation panel 20 to a screen corresponding to the display attribute 2 is carried out (S56). If the display attribute 2 is not attached (S55: NO) or the processing of S56 is ended, whether or not the display attribute 3 is attached is determined (S57). If the display attribute 3 is attached (S57: YES), the display change processing (character size change processing in this embodiment) for changing the screen on the operation panel 20 to a screen corresponding to the display attribute 3 is carried out (S58). If the display attribute 3 is not attached (S57: NO) or the processing of S58 is ended, the display processing of S44 is ended.

Figure 9:
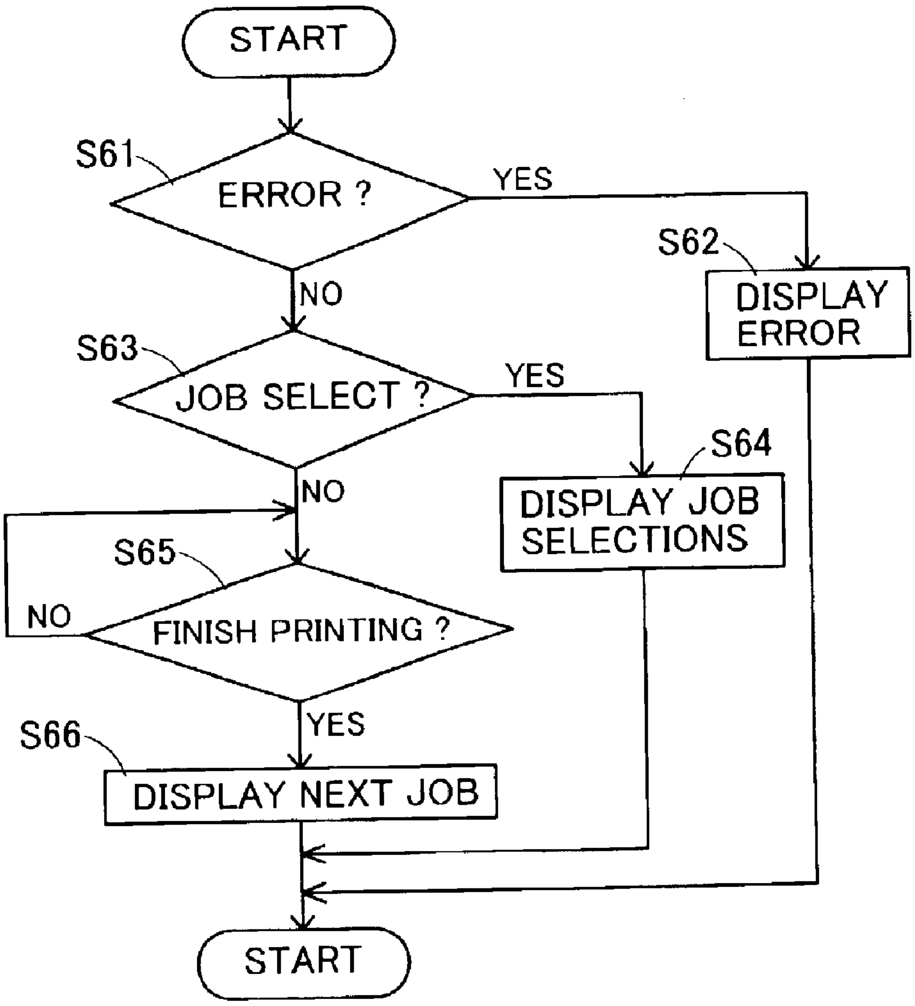
FIG. 9 is a flow chart showing display object job determination processing relating to the operation panel.

Next, display job determination processing of S51 will be described in detail with reference to the flow chart of FIG. 9. First, whether or not an error occurs in the digital copier 1 is determined (S61). If an error exists (S61: YES), the screen of the operation panel 20 is changed to information of job including the error (S62). If no error exists (S61: NO), whether or not other job than a job being printed is selected from the job list display screen by the operating person is determined (S63). If any job is selected (S63: YES), the screen is changed to a display about information of the selected job (S64). If no job is selected (S63: NO), whether or not print of the displayed job is ended is determined (S65). If the print is not ended (S65: NO), the system stands by until the print is ended. If the print is ended (S65: YES), an ended job is deleted from the list. Alternatively, the display is changed to a next job (S66). If the display change processing of S66, S62 or S64 is ended, the display job determination processing of S51 is ended.

Figure 10:
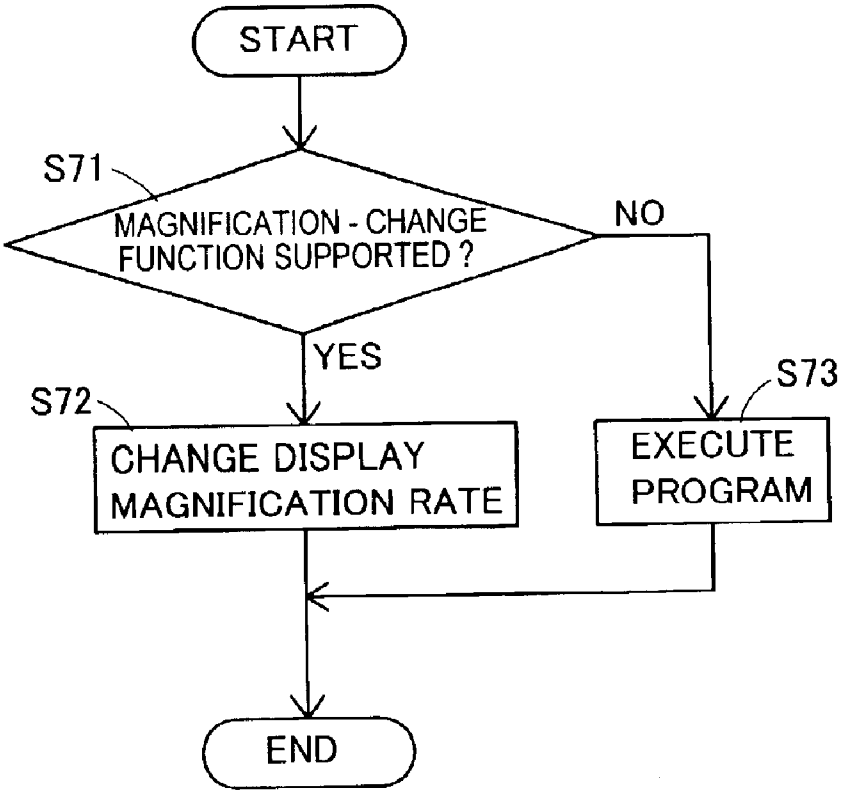
FIG. 10 is a flow chart showing display magnification changing processing relating to the operation panel.
Figure 11:
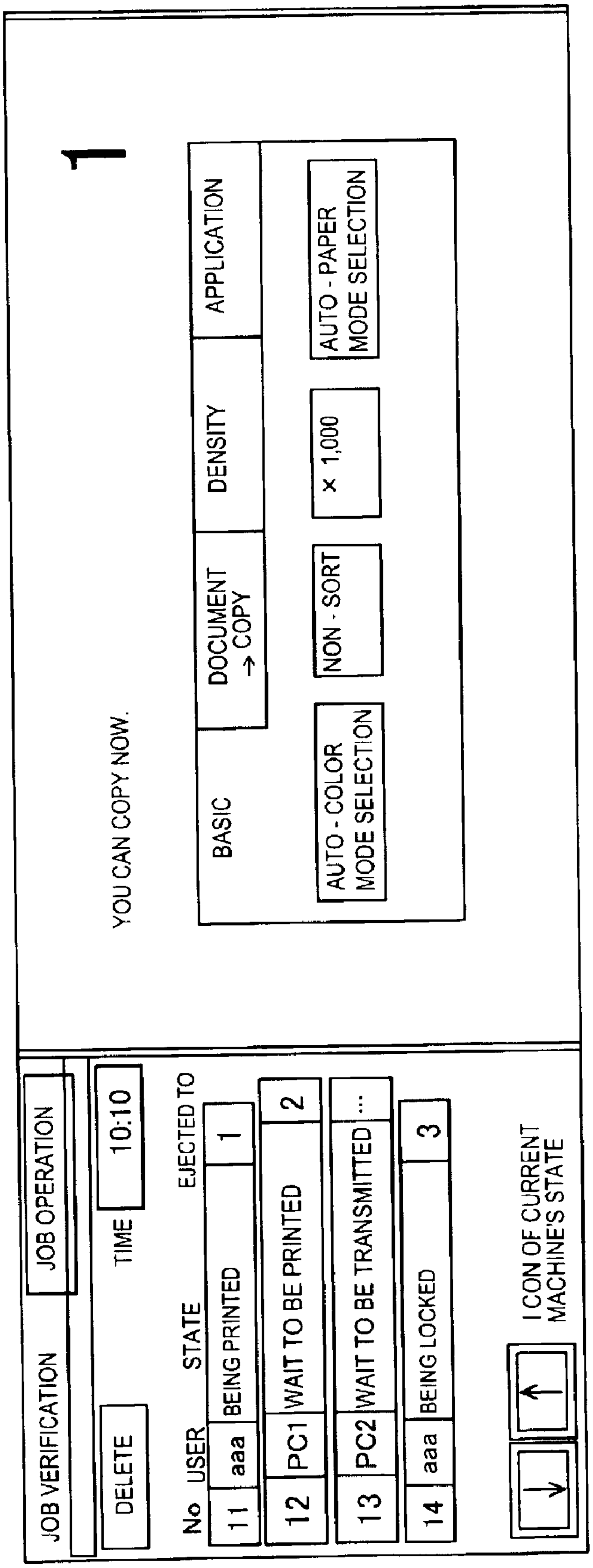
FIG. 11 is a diagram showing a screen after the display magnification changing processing is carried out, relating to the operation panel.

Next, the display change processing of S54, S56, and S58 will be described in detail. In the display change processing of S54, display magnification change processing based on the flow chart of FIG. 10 is carried out. First, whether or not proper control of the digital copier 1 supports a function for display magnification change processing is determined (S71). If that function is supported (S71: YES), a content on the screen of the operation panel 20 is enlarged or reduced (S72). On the other hand, if that function is not supported (S71: NO), a program corresponding to the display attribute 1 attached to job data is executed (S73). Consequently, the display magnification of the operation panel 20 is changed regardless of whether or not that function is supported. If the display change processing of S72 or S73 is ended, the display magnification change processing of S54 is ended. After this processing is ended, a job to which the display attribute 1 is attached as shown in FIG. 11 (job 12, 13 in FIG. 11) is displayed on the screen in enlargement. A program to be attached does not intend to achieve a function impossible to achieve as a hardware component (for example, color display on a monochrome display) but a function which is not supported under control although it is possible to achieve as a hardware component. This embodiment is assumed to contain all necessary hardware functions.

Figure 12:
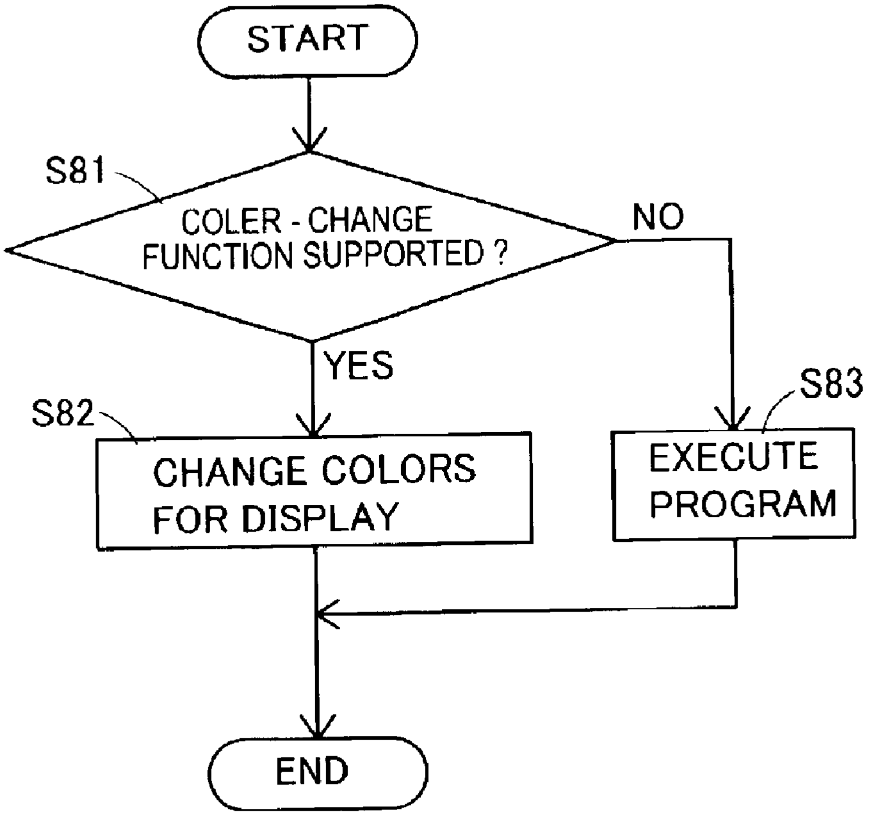
FIG. 12 is a flow chart showing the display color changing processing relating to the operation panel.
Figure 13:
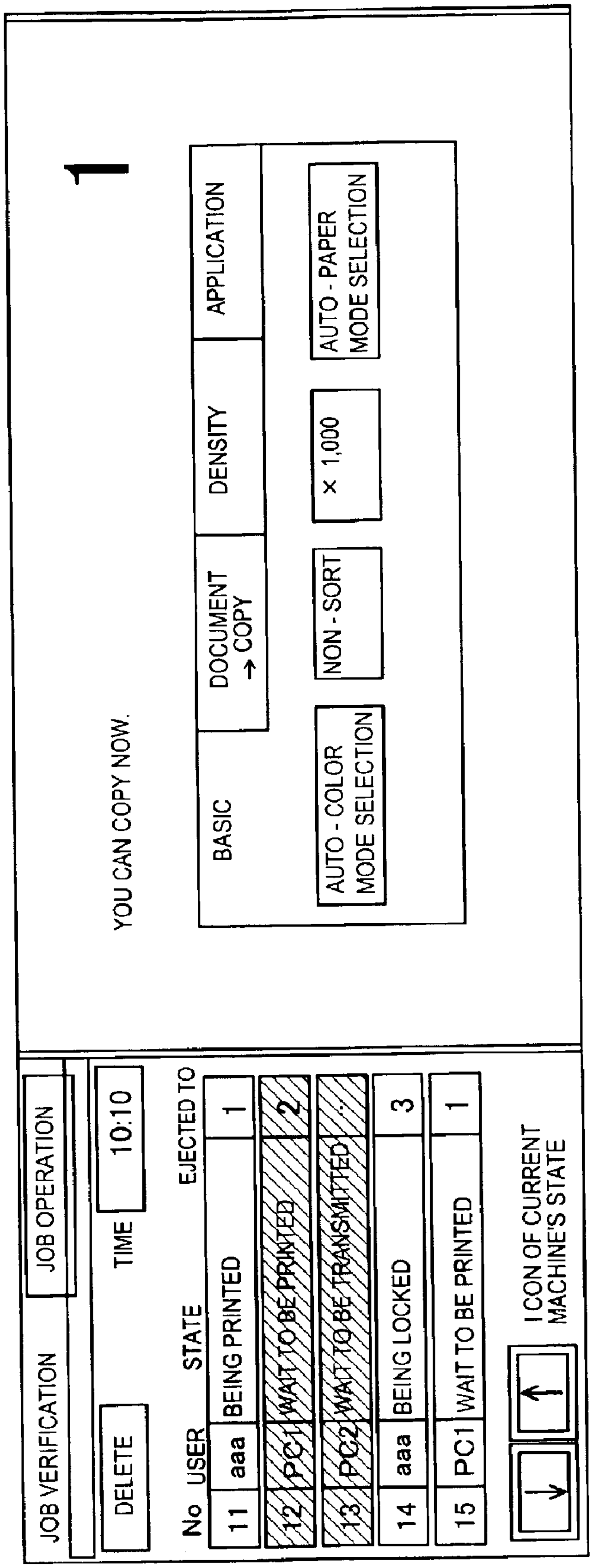
FIG. 13 is a diagram showing a screen after the display color changing processing is carried out, relating to the operation panel.

In the display change processing of S56, the display color change processing based on the flow chart of FIG. 12 is carried out. First, whether or not the proper control of the digital copier 1 supports the display color change function is determined (S81). If that function is supported (S81: YES), the display color of the operation panel 20 is changed (S82). On the other hand, unless that function is supported (S81: NO), a program corresponding to the display attribute 2 attached to job data is executed (S83). Consequently, the display color of the operation panel 20 is changed regardless of whether or not that function is supported. If the display change processing of S82 or S83 is ended, the display color change processing of S56 is ended. A screen after this processing is ended indicates a state in which the display color of the job to which the display attribute 2 is attached (job 12, 13 in FIG. 13) is changed. Also, in the display change processing of S58, character size change processing is carried out according to the same processing procedure.

As described above according to this embodiment, job data is created with the personal computer 4. Display attribute and a program corresponding to the display attribute are attached to this job data. Consequently, job data which allows job information which the operating person intends to be displayed is created on the operation panel 20 of the digital copier 1. Then, that job data is transmitted to the digital copier 1. On the other hand, that job is displayed on the screen of the operation panel 20 of the digital copier 1. Whether or not the display attribute is attached to the job data is determined through the operation panel 20 of this digital copier 1. If the display attribute is attached, the display screen is changed corresponding to that display attribute. Namely, the displayed content can be changed for each job. Further, the display attribute includes display magnification change, display color change and the like. Consequently, even a handicapped person can recognize a display content. Because the digital copier 1 changes its display condition according to the display attribute attached to job data, it does not need to contain preliminary setting for the display. Thus, there are achieved a job information display apparatus, a job execution apparatus, a job instruction apparatus and a job transmitter/receiver system in which display style can be changed depending on the display attribute of each job and which are gentle for the operating person (particularly the handicapped person).

If the operation panel 20 does not support a function corresponding to the display attribute, it executes a program attached to the job data. As a result, even if any function corresponding to the display attribute is not supported, the display screen can be changed to a screen corresponding to the display attribute.

And, this embodiment is only an exemplification but does not restrict the present invention. Therefore, naturally, the present invention may be improved or modified in various ways within a scope not departing from the gist thereof. For example, although this embodiment indicates a print job as an example, a scan job or other job may be adopted. In this case, data structure necessary for a screen display is the same. That is, the display attribute and a program accompanying the display attribute are attached. On the other hand, its data section is different from the case of the print job and comprised of JOB ID, distribution method and data sending destination (in case of scan job).

Although according to this embodiment, the personal computer 4, which is a transmission side of the job data, transmits job data to only the digital copier 1, the job data may be transmitted to all digital copiers or printers connected to the network 10. Then, any digital copier or printer is capable of displaying the job data corresponding to the display attribute thereof. Consequently, any digital copier displays the job in a state corresponding to the display attribute set up by the personal computer 4. For the reason, the handicapped person and the like do not feel inconvenience anywhere.

Further, if the job display attribute is changed manually with any one of the digital copiers which display the job, the content of the change may be transmitted to other copiers. Consequently, other copiers which receive that changed content can change the display of the given job. As a result, a uniform indication through the entire system can be achieved.

Although according to this embodiment, the display condition is changed depending on the display attribute after initial setting is performed (S52), the present invention is not restricted to this example. For example, it is permissible to determine whether or not any display attribute exists after a job to be displayed is determined. Then, if any display attribute is attached, a processing corresponding to the display attribute may be performed directly without the initial setting.

Although according to this embodiment, representation of only information about the job data provided with a signal relating to the display attribute is changed, the present invention is not restricted to this example. For example, it is permissible to change a common section also of the list display screen. Further, as regards specific display attributes, it is permissible to change information about all job data even on the list display screen.

Additionally, job information of the entire network may be displayed at a single position. For example, job information possessed by all digital copiers connected to the network 10 may be displayed on the monitor 6 accompanying the server 5. That job information can be changed depending on the display attribute also here.

What is claimed is:

1. A job information display apparatus for displaying information of a job on a screen, comprising:

a display attribute recognition section for recognizing display attribute of each job; and a display controller for changing display style for job information based on display attribute recognized by the display attribute recognition section.

2. A job information display apparatus as claimed in claim 1 wherein the display controller executes a display program corresponding to the display attribute attached to a job in case a function corresponding to the recognized display attribute is not supported.

3. A job execution apparatus for executing a job comprising:

a display for displaying information of a job;

a display attribute recognition section for recognizing display attribute of each job; and a display controller for changing display style of information of each job displayed on the display based on display attribute recognized by the display attribute recognition section.

4. A job execution apparatus as claimed in claim 3 further comprising:

a receiving unit for receiving job data from outside, wherein a job is executed based on job data received by the receiving unit.

5. A job execution apparatus as claimed in claim 4 wherein the receiving unit acquires the information of the display attribute together with the job data in case information of display attribute is attached to job data.

6. A job execution apparatus as claimed in claim 5 wherein the receiving unit, if a display program is attached to job data together with the display attribute, acquires the display program with the job data and information of the display attribute, and the display controller executes a display program acquired by the receiving unit in case a function corresponding to the acquired display attribute is not supported.

7. A job execution apparatus as claimed in claim 3 wherein a print job for forming an image on a sheet member is executed.

8. A job execution apparatus as claimed in claim 3 wherein the display controller displays a list of jobs to be executed and changes the display style for a corresponding job of listed jobs depending on display attribute recognized by the display attribute recognition section.

9. A job execution apparatus as claimed in claim 3 wherein display attribute to be recognized by the display attribute recognition section includes at least any one selected from a group consisting of display magnification, display color, style of character to be displayed, and size of character to be displayed.

10. A job instruction apparatus for transmitting job data to a job execution apparatus comprising:

a job data creating section for creating job data: and a transmitting section for transmitting job data created by the job data creating section to a job execution apparatus, wherein the job data creating section attaches a signal relating to display attribute to a created job data.

11. A job instruction apparatus as claimed in claim 10 wherein the job data creating section attaches a display program corresponding to display attribute to created job data as a signal relating to the display attribute.

12. A job processing system including a job instruction apparatus for transmitting job data and a job execution apparatus for receiving the job data so as to execute the job, wherein the job execution apparatus comprises:

a display for displaying information of job;

a display attribute recognition section for recognizing display attribute of each job; and a display controller for changing display style of information of each job displayed on the display based on display attribute recognized by the display attribute recognition section, and the job instruction apparatus comprises:

a job data creating section for creating job data; and a transmitting section for transmitting job data created by the job data creating section to the job execution apparatus, the job data creating section attaching a signal relating to display attribute to created job data.

13. A job processing system as claimed in claim 12 wherein the job execution apparatus acquires information of display attribute together with job data transmitted from the job instruction apparatus.

14. A job processing system as claimed in claim 12 wherein the job data creating section attaches a display program corresponding to display attribute to created job data as a signal relating to the display attribute.

15. A job processing system as claimed in claim 14 wherein the job execution apparatus acquires display program together with job data and information of display attribute transmitted from the job instruction apparatus.

16. A job processing system as claimed in claim 15 wherein the display controller executes a display program acquired together with job data in case a function corresponding to the display attribute acquired with the job data is not supported.

17. A job processing system as claimed in claim 12 wherein the job execution apparatus executes print job for forming an image on a sheet member.

18. A job processing system as claimed in claim 12 wherein the display controller displays a list of jobs to be executed and changes the display style for a corresponding job of listed jobs depending on display attribute recognized by the display attribute recognition section.

19. A job processing system as claimed in claim 12 wherein display attribute to be recognized by the display attribute recognition section includes at least any one selected from a group consisting of display magnification, display color, style of character to be displayed, and size of character to be displayed.

* * * * *